(12) United States Patent
Uemura et al.

(10) Patent No.: US 8,112,002 B2
(45) Date of Patent: Feb. 7, 2012

(54) TRANSMITTING CIRCUIT AND COMPLEMENTARY OPTICAL WIRING SYSTEM

(75) Inventors: Hiroshi Uemura, Yokohama (JP); Hideto Furuyama, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 275 days.

(21) Appl. No.: 12/561,560

(22) Filed: Sep. 17, 2009

(65) Prior Publication Data

US 2010/0142976 A1 Jun. 10, 2010

(30) Foreign Application Priority Data

Dec. 8, 2008 (JP) ................................ 2008-311959

(51) Int. Cl.
*H04B 10/00* (2006.01)
(52) U.S. Cl. .................. 398/183; 398/140; 398/182
(58) Field of Classification Search .................. 398/183, 398/140–172
See application file for complete search history.

(56) References Cited

U.S. PATENT DOCUMENTS

| | | | | | |
|---|---|---|---|---|---|
| 3,486,029 | A | * | 12/1969 | Claflin et al. | 398/115 |
| 4,052,611 | A | * | 10/1977 | Fish | 398/145 |
| 4,292,551 | A | * | 9/1981 | Kolmann | 327/514 |
| 4,393,518 | A | * | 7/1983 | Briley | 398/145 |
| 4,497,068 | A | * | 1/1985 | Fischer | 398/191 |
| 4,577,207 | A | * | 3/1986 | Copeland | 257/90 |
| 4,784,001 | A | * | 11/1988 | Gaertner | 73/861.12 |
| 4,972,514 | A | * | 11/1990 | Linke | 398/138 |
| 5,023,945 | A | * | 6/1991 | Childs | 398/161 |
| 5,060,306 | A | * | 10/1991 | Nakamura et al. | 398/183 |
| 5,126,871 | A | * | 6/1992 | Jeffers | 398/145 |
| 5,138,475 | A | * | 8/1992 | Bergmann et al. | 398/41 |
| 5,550,864 | A | * | 8/1996 | Toy et al. | 375/293 |
| 5,673,130 | A | * | 9/1997 | Sundstrom et al. | 398/154 |
| 5,790,286 | A | * | 8/1998 | Bae | 398/5 |
| 5,838,471 | A | * | 11/1998 | Beard | 398/136 |
| 6,310,707 | B1 | * | 10/2001 | Kawase et al. | 398/119 |
| 6,365,911 | B1 | * | 4/2002 | Furuyama | 257/25 |

(Continued)

FOREIGN PATENT DOCUMENTS

JP 3-58532 3/1991

(Continued)

OTHER PUBLICATIONS

U.S. Appl. No. 12/504,139, filed Jul. 16, 2009, Hiroshi Uemura, et al.

(Continued)

*Primary Examiner* — Danny Leung
(74) *Attorney, Agent, or Firm* — Oblon, Spivak, McClelland, Maier & Neustadt, L.L.P.

(57) ABSTRACT

A transmitting circuit has a first transmitter configured to generate a first electric pulse signal in synchronization with a rising edge of a digital electric input signal, a second transmitter configured to generate a second electric pulse signal in synchronization with a falling edge of the digital electric input signal, a first variable impedance circuit configured to supply a bias current to a first light-emitting element only for a predetermined period before the first light-emitting element for converting the first electric pulse signal into a first light signal is supplied with the first electric pulse signal, and a second variable impedance circuit configured to supply a bias current to a second light-emitting element only for a predetermined period before the second light-emitting element for converting the second electric pulse signal into a second light signal is supplied with the second electric pulse signal.

20 Claims, 12 Drawing Sheets

U.S. PATENT DOCUMENTS

| | | | |
|---|---|---|---|
| 6,619,866 B1* | 9/2003 | Sun et al. | 398/141 |
| 7,418,213 B2* | 8/2008 | Denoyer | 398/210 |
| 7,492,981 B2* | 2/2009 | Furuyama | 385/14 |
| 7,792,433 B2* | 9/2010 | Bai | 398/183 |
| 2006/0176919 A1* | 8/2006 | Nagasaka et al. | 372/38.02 |
| 2008/0205903 A1* | 8/2008 | Yonenaga et al. | 398/186 |
| 2009/0310978 A1* | 12/2009 | Uemura et al. | 398/195 |
| 2010/0021180 A1* | 1/2010 | Uemura et al. | 398/183 |
| 2010/0142976 A1* | 6/2010 | Uemura et al. | 398/183 |

FOREIGN PATENT DOCUMENTS

| | | |
|---|---|---|
| JP | 4-283978 | 10/1992 |
| JP | 2004-153442 | 5/2004 |
| JP | 2006-216849 | 8/2006 |

OTHER PUBLICATIONS

U.S. Appl. No. 12/470,737, filed May 22, 2009, Hiroshi Uemura, et al.

Hideto Furuyama, et al., "A Complementary Optical Interconnection for Inter-Chip Networks", IEICE Trans. Electron, vol. E76-C, No. 1, Jan. 1993., pp. 112-117.

* cited by examiner

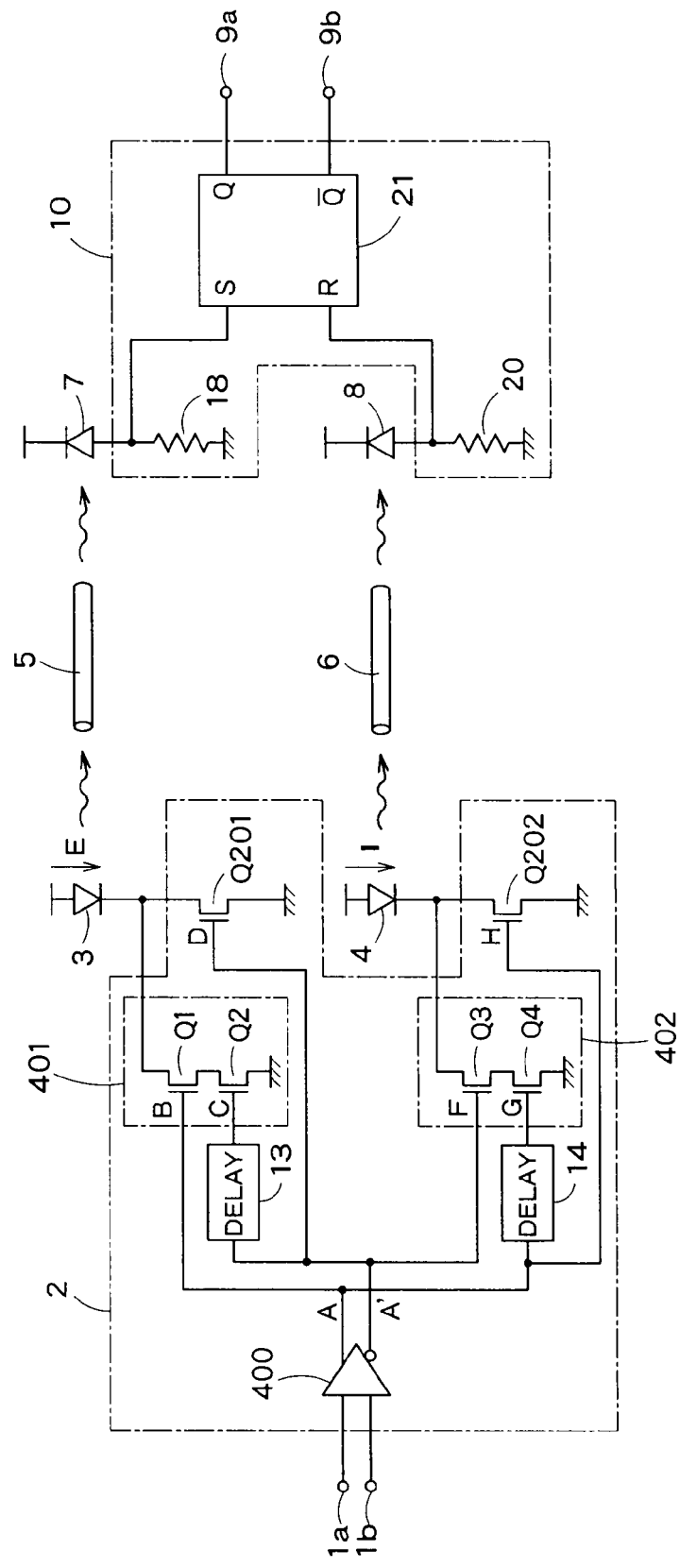
F I G. 1

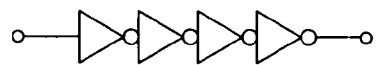
F I G. 3(a)
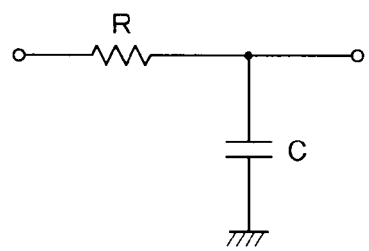
F I G. 3(b)
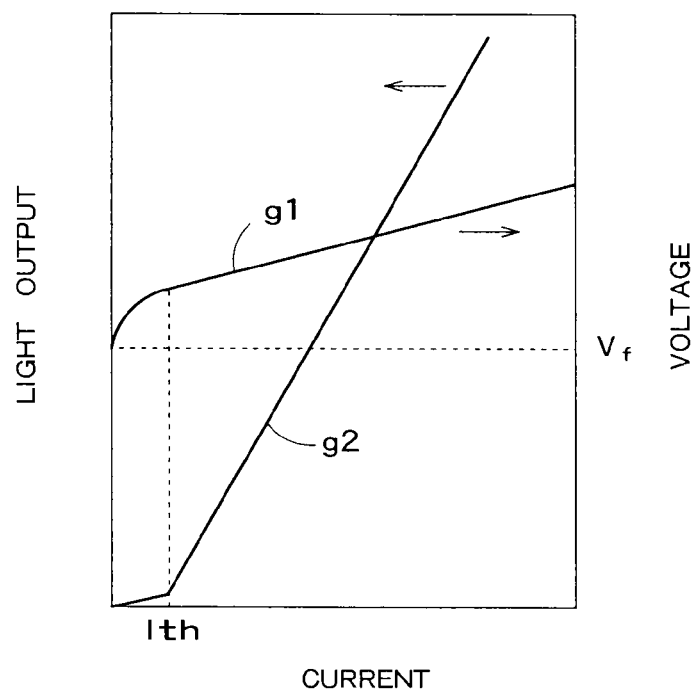
F I G. 4

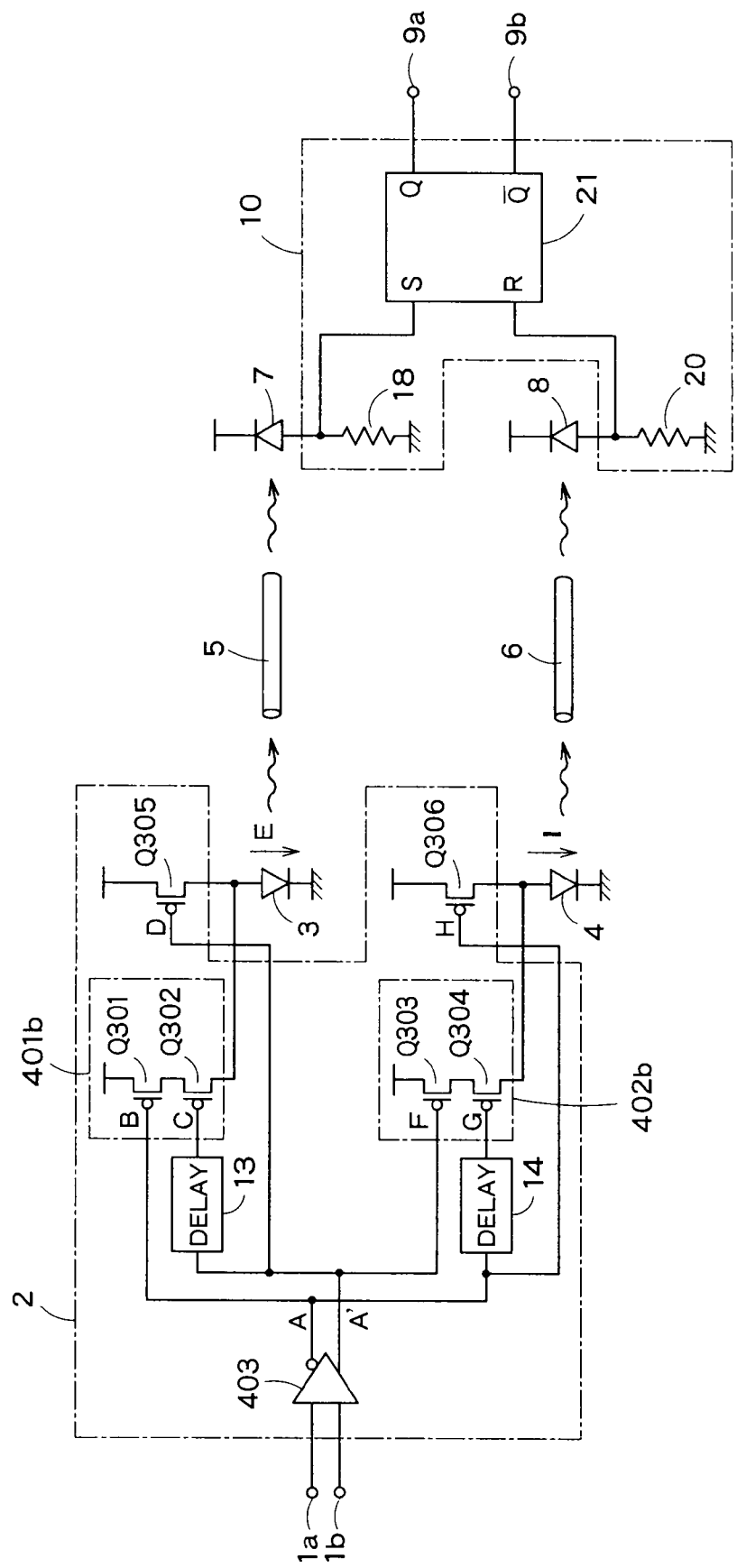
F I G. 11

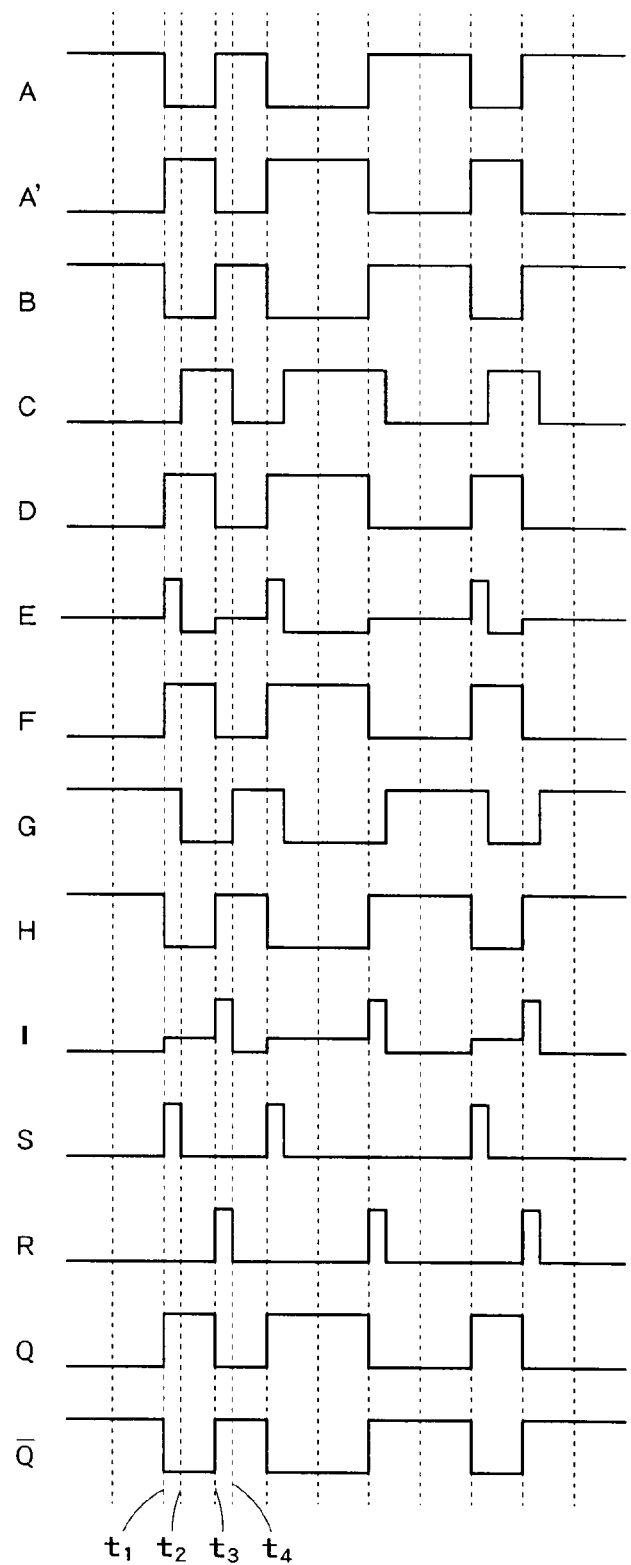
F I G. 12

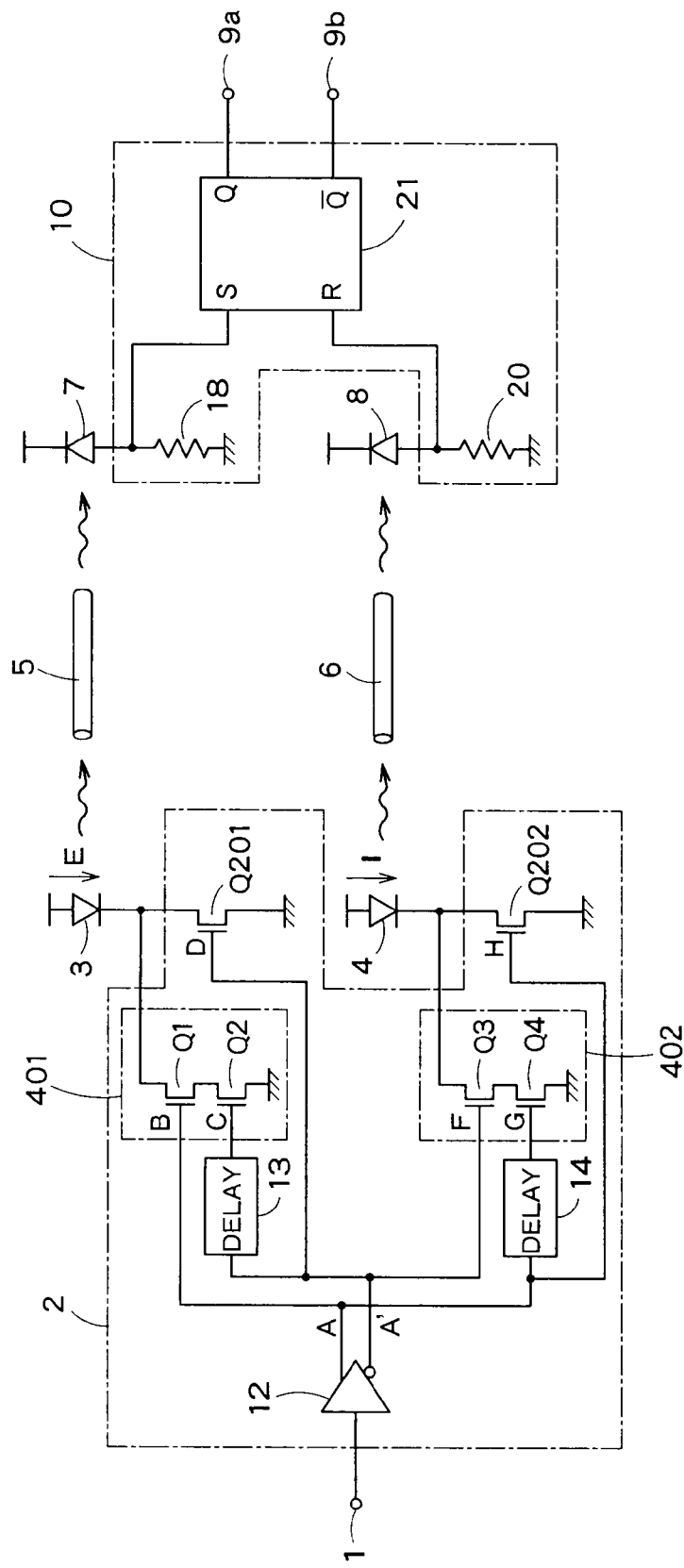
F I G. 13

TRANSMITTING CIRCUIT AND COMPLEMENTARY OPTICAL WIRING SYSTEM

CROSS REFERENCE TO RELATED APPLICATIONS

This application is based upon and claims the benefit of priority from the prior Japanese Patent Application No. 2008-311959, filed on Dec. 8, 2008, the entire contents of which are incorporated herein by reference.

BACKGROUND

In recent years, a problem such as delays, loss, noise or the like has been emphasized in signal transmission between LSI chips. In personal computers and mobile communication devices such as mobile phones in particular, noise interference between various radio signals and electric signals in the devices has become controversial. More specifically, EMI (Electromagnetic Interference) that affects other electronic devices or circuits through emission of electromagnetic noise and EMS (Electromagnetic Susceptibility) that receives influences of electromagnetic noise from other electronic devices or circuits have become controversial. Therefore, a concept called as EMC (Electromagnetic Compatibility) taking both EMI and EMS into consideration has become more and more important in the field of device design.

Under such circumferences, there is an increasing trend to apply optical signals which are not only high speed and low loss but also free of electromagnetic noise to signal transmission between LSI chips. However, since a finite power supply such as a battery is used in a mobile device, electronic parts in the device are strongly required to achieve low power consumption. The same applies even when light is used as a signal transmitter. As a low power optical wiring system, JP-A No. 3-58532 (Kokai) (hereinafter, "Patent Document 1") and JP-A No. 2004-153442 (Kokai) (hereinafter, "Patent Document 2") disclose optical wiring systems that reduce power consumption by shortening a time to supply a light-emitting element with a driving current. Furthermore, JP-A No. 2006-216849 (Kokai) (hereinafter, "Patent Document 3") and JP-A No. 4-283978 (hereinafter, "Patent Document 4") disclose optical wiring systems that reduce power consumption by shortening a time to supply the light-emitting element with a bias current.

SUMMARY OF THE INVENTION

According to one aspect of the present invention, a transmitting circuit comprising: a first transmitter configured to generate a first electric pulse signal in synchronization with a rising edge of a digital electric input signal by combining at least one of the digital electric input signal and an inverted signal of the digital electric input signal with at least one of a first delay signal obtained by delaying the digital electric input signal by a time shorter than a minimum pulse width of the digital electric input signal and a second delay signal obtained by delaying the inverted signal of the digital electric input signal by a time shorter than the minimum pulse width of the digital electric input signal; a second transmitter configured to generate a second electric pulse signal in synchronization with a falling edge of the digital electric input signal by combining at least one of the digital electric input signal and the inverted signal of the digital electric input signal with at least one of the first delay signal and the second delay signal; a first variable impedance circuit configured to supply a bias current to a first light-emitting element only for a predetermined period before the first light-emitting element for converting the first electric pulse signal into a first light signal is supplied with the first electric pulse signal; and a second variable impedance circuit configured to supply a bias current to a second light-emitting element only for a predetermined period before the second light-emitting element for converting the second electric pulse signal into a second light signal is supplied with the second electric pulse signal.

According to the other aspect of the present invention, A complementary optical wiring system comprising: a first light-emitting element configured to convert a first electric pulse signal in synchronization with a rising edge of a digital electric input signal into a first light signal; a second light-emitting element configured to convert a second electric pulse signal in synchronization with a falling edge of the digital electric input signal into a second light signal; a transmitting circuit comprising: (a) a first transmitter configured to generate the first electric pulse signal by combining at least one of the digital electric input signal and an inverted signal of the digital electric input signal with at least one of a first delay signal obtained by delaying the digital electric input signal by a time shorter than a minimum pulse width of the digital electric input signal and a second delay signal obtained by delaying the inverted signal of the digital electric input signal by a time shorter than the minimum pulse width of the digital electric input signal; (b) a second transmitter configured to generate the second electric pulse signal by combining at least one of the digital electric input signal and the inverted signal of the digital electric input signal with at least one of the first delay signal and the second delay signal; (c) a first variable impedance circuit configured to supply a bias current to the first light-emitting element only for a predetermined period before the first light-emitting element starts to be supplied with the first electric pulse signal; and (d) a second variable impedance circuit configured to supply a bias current to the second light-emitting element only for a predetermined period before the second light-emitting element starts to be supplied with the second electric pulse signal; a first optical transmission path configured to transmit the first light signal; a second optical transmission path configured to transmit the second light signal; a first light-receiving element configured to convert the first light signal transmitted through the first optical transmission path to the third electric pulse signal; a second light-receiving element configured to convert the second light signal transmitted through the second optical transmission path to the fourth electric pulse signal; and a receiving circuit configured to generate a digital electric output signal corresponding to the digital electric input signal in synchronization with the third and the fourth electric pulse signal.

BRIEF DESCRIPTION OF THE DRAWINGS

FIG. 1 is a circuit diagram showing a schematic structure of a complementary optical wiring system according to a first embodiment of the present invention;

FIG. 3 is a circuit diagram showing examples of an internal configuration of a first and a second delay circuit;

FIG. 4 is a graph g1 showing the relationship between the bias current and the voltage of a semiconductor laser capable of being used as a first and a second light-emitting elements 3 and 4 and a graph g2 showing the relationship between the bias current and the light output of the semiconductor laser;

FIG. 11 is a circuit diagram showing another modification example of a schematic structure of the complementary optical wiring system of FIG. 1;

FIG. 12 is a timing diagram at each node of the system of FIG. 11;

FIG. 13 is a circuit diagram showing a schematic structure of a complementary optical wiring system in which the digital electric input signal of FIG. 1 is replaced with a single end signal.

DETAILED DESCRIPTION OF THE INVENTION

Figure 2:
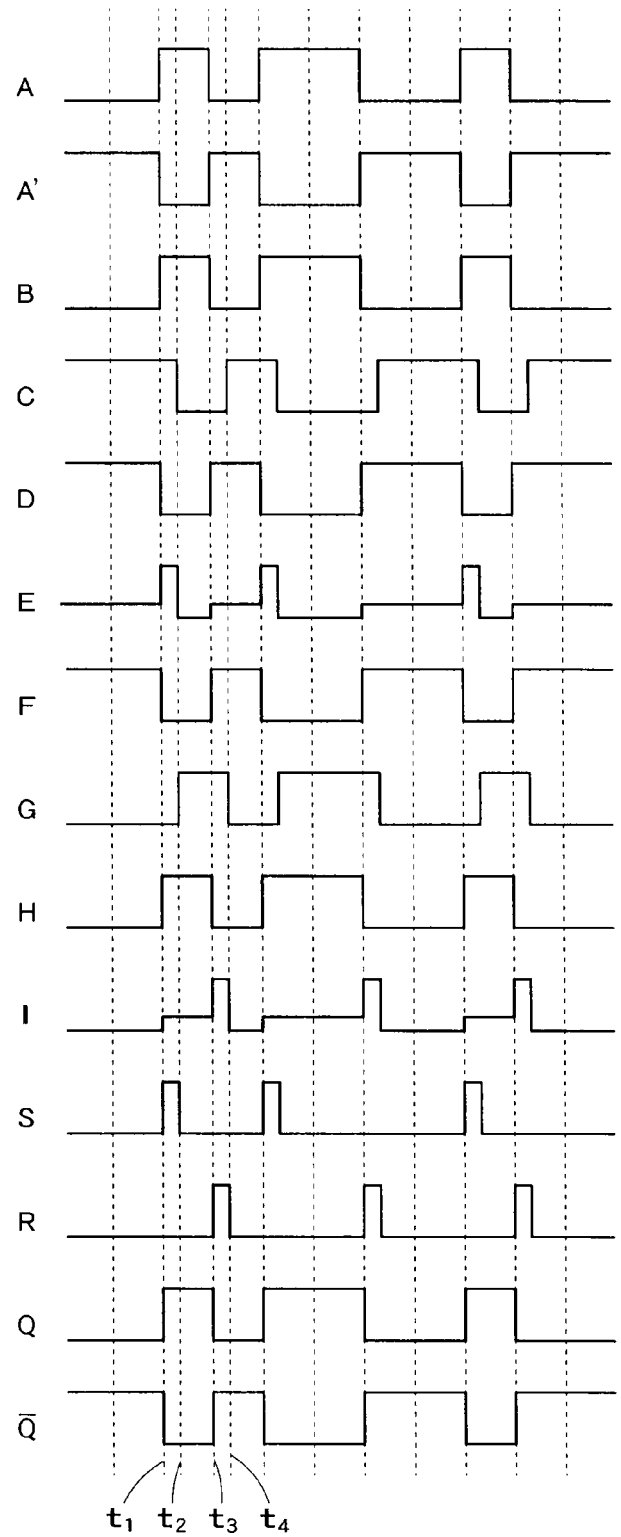
FIG. 2 is a timing diagram of nodes A to I, S, R, Q, and /Q in the complementary optical wiring system of FIG. 1.

First, technical differences between the above described Patent Documents 1 to 4 which have been conventionally proposed as a method of transmitting an optical signal at low power consumption and embodiments of the present invention will be explained briefly.

In Patent Document 1, two diode type light-emitting elements connected to each other in series alternately emit light by a CR differential current pulse flowing when the digital electric input signal changes in order to transmit a signal of only rising information and falling information of a digital electric input signal, thereby reducing power consumption.

However, in the technique of Patent Document 1, the CR differential current pulses overlap each other when the pulses are successive at short intervals. As a result, the wave pattern of the following CR differential current easily changes, which is so-called a pattern effect. Further, due to on-voltage characteristics (rising voltage VF) specific to the diode type light-emitting element, large inrush current to charge the voltage VF flows and an excessive pulse is easily generated in burst operation, in which a capacitor in a completely discharged state (capacitor voltage—0 V) enters into an operating state (capacitor voltage—voltage VF).

Further, Patent Document 2 discloses a technique in which electric pulse signals (also referred to as electric short pulse signals) having a pulse width shorter than the minimum pulse width of the digital electric input signal are generated in synchronization with the rising edge and the falling edge of the digital electric input signal, and the electric pulse signals, are converted into light signals which are transmitted through the same optical transmission path.

However, in Patent Document 2, a receiving side circuit cannot determine whether the transmitted light signal corresponds to the rising edge or the falling edge of the digital electric input signal. Therefore, when an error occurs in receiving the light signal due to the influence of noise, for example, there is likelihood that the digital electric input signal cannot be correctly decoded in the following operation. Further, when a high-speed digital electric input signal is transmitted, there is a likelihood that the light signal in synchronization with the rising edge and the light signal in synchronization with the falling edge interfere with each other to cause a trouble to the signal transmission.

As stated above, techniques disclosed in Patent Documents 1 and 2 have various problems lowering the reliability of the signal transmission. The present invention is made to solve the problems by digitally generating electric pulse signals in synchronization with the rising edge and the falling edge of the digital electric input signal and by transmitting the light signals generated based on the electric pulse signals separately from each other as explained later.

Patent Documents 3 and 4 disclose a technique in which power consumption is reduced by shortening the period to supply a bias current to a light-emitting element which will be explained later. In Patent Document 3, electric pulse signals in synchronization with the rising edge and the falling edge of the digital electric input signal are generated by an edge detector, and a timing signal for supplying the bias current and driving current is generated by a timing generator in synchronization with each electric pulse signal.

However, circuit elements for determining, based on the electric pulse signal, a period supplying the bias current and a period supplying the driving current are necessary in the timing generator. Therefore, there are various defects such as reliability degradation, increase of circuit area, and increase of power consumption caused by the complicated circuit. Further, in Patent Document 3, light signals in synchronization with the rising edge and the falling edge of the digital electric input signal are generated by one light-emitting element, and the generated light signals are transmitted through the same optical transmission path, by which the reliability of the signal transmission may be lowered similarly to Patent Document 2.

Further, Patent Document 4 discloses a technique in which the period supplying the driving current is determined by the digital electric input signal, and the period supplying the bias current is determined by a combined signal obtained by combining the digital electric input signal and a delay signal obtained by delaying the digital electric input signal.

However, in Patent Document 4, the period supplying the bias current before supplying the driving current cannot be made longer than the pulse width of the digital electric input signal. Therefore, when transmitting an electric pulse signal having a pulse width shorter than the minimum pulse width of the digital electric input signal, it is almost impossible to supply the bias current, and the quality of signal transmission may lower.

To solve the problems of Patent Documents 3 and 4, according to the present invention, the period supplying the bias current can be determined to be sufficiently long with a simplified circuit structure. Therefore, the reliability of signal transmission characteristics can be improved and power consumption can be reduced as explained later.

Embodiments according to the present invention will hereinafter be explained with reference to the accompanying drawings.

First Embodiment

FIG. 1 is a circuit diagram showing a schematic structure of a complementary optical wiring system according to a first embodiment of the present invention. FIG. 2 is a timing diagram of nodes A to I, S, R, Q, and /Q in the complementary optical wiring system of FIG. 1. Note that, in this specification, the bar attached above a reference symbol in the drawings is expressed by the symbol "/," which is described before the reference symbol. In FIG. 2, the vertical axes of the reference symbols E and I express the electric current flowing through a first and a second light-emitting elements 3 and 4, respectively, and each vertical axis of the other reference symbols expresses the voltage at each node.

The complementary optical wiring system of FIG. 1 includes a first differential signal input terminal 1a, a second differential signal input terminal 1b, a transmitting circuit 2, the first and the second light-emitting elements 3 and 4, a first and a second optical transmission paths 5, and 6, a first and a second light-receiving elements 7 and 8, a receiving circuit 10, and an output terminal 9a, and 9b.

The transmitting circuit 2 combines delay signals obtained by delaying a digital electric input signal and an inverted signal thereof inputted from the first and the second differential signal input terminals 1a and 1b by a time shorter than the minimum pulse width of the digital electric input signal with the digital electric input signal and the inverted signal thereof to generate a first electric pulse signal in synchronization with a rising edge of the digital electric input signal having a pulse width corresponding to the delay time and a second electric pulse signal in synchronization with a falling edge of the digital electric input signal having a pulse width corresponding to the delay time. The transmitting circuit 2 (or part thereof) can be implemented by a driver IC formed of one IC chip. In this case, the driver IC may include other circuits (functions). For example, a signal input part of the driver IC may have a parallel-serial input signal conversion circuit.

The transmitting circuit 2 includes a differential buffer 400, a first and a second delay circuits 13 and 14, NMOS transistors Q1 to Q4 (first to fourth switching elements), and a first and a second variable resistance elements (first and second variable impedance circuit) formed of NMOS transistors Q201 and Q202.

The differential buffer 400 amplifies the digital electric input signal and the inverted signal of a first and a second differential signals inputted from the first and the second differential signal input terminals 1a and 1b, and shapes the waveform thereof. The differential buffer 400 further outputs the first differential signal from a first differential output terminal A and the second differential signal from a second differential output terminal A', respectively. A signal A has the same logic information as that of the digital electric input signal, while a signal A' has the same logic information as that of the inverted signal of the digital electric input signal.

The first delay circuit 13 delays the output signal A' of the second differential output terminal by a time shorter than the minimum pulse width of the digital electric input signal to generate a first delay signal, while the second delay circuit 14 delays the output signal A of the first differential output terminal by a time shorter than the minimum pulse width of the digital electric input signal to generate a second delay signal. Each of the first and the second delay circuits 13 and 14 can be formed of a buffer circuit having inverter circuits connected in series at even stages as shown in FIG. 3(a), or an RC delay circuit formed of a resistance element R and a capacitor C as shown in FIG. 3(b), for example. However, the specific structure of the circuit is not particularly limited.

Note that the time when the signal A' is delayed by the first delay circuit 13 and the time when the signal A is delayed by the second delay circuit 14 can be the same or be different from each other. FIG. 2 shows an example in which each time to be delayed is the same.

The MOS transistors Q1 and Q2 are cascade-connected between the cathode of the first light-emitting element 3 and a ground terminal (reference voltage terminal). The gate of the MOS transistor Q1 is connected to the first differential output terminal A (B), while the gate of the MOS transistor Q2 is connected to the output terminal C of the first delay circuit 13. The MOS transistors Q1 and Q2 form a first transmitter 401 for generating the first electric pulse signal.

The MOS transistors Q3 and Q4 are cascade-connected between the cathode of the second light-emitting element 4 and the ground terminal. The gate of the MOS transistor Q3 is connected to the second differential output terminal A'(F), while the gate of the MOS transistor Q4 is connected to the output terminal G of the second delay circuit 14. The MOS transistors Q3 and Q4 form a second transmitter 402 for generating the second electric pulse signal.

The first and the second transmitters 401 and 402 generate the first and the second electric pulse signals respectively by combining at least one of the signal A having the same logic information as the digital electric input signal and the signal A' having the same logic information as the inverted signal of the digital electric input signal with at least one of the delay signals obtained by delaying the signals A and A' by the first and the second delay circuits 13 and 14. The present embodiment shows an example in which the first transmitter 401 generates the first electric pulse signal by combining the signal A with the delay signal of the signal A', while the second transmitter 402 generates the second electric pulse signal by combining the signal A' with the delay signal of the signal A.

The first variable resistance element Q201 is connected between the cathode of the first light-emitting element 3 and the ground terminal, and its gate is connected to the first digital electric control signal D (the output signal A' of the second differential output terminal). The second variable resistance element Q202 is connected between the cathode of the second light-emitting element 4 and the ground terminal, and its gate is connected to the second digital electric control signal H (the output signal A of the first differential output terminal). The first and the second variable resistance elements Q201 and Q202 switch whether or not to supply bias currents to the first and the second light-emitting elements 3 and 4, respectively. Each of the first and the second variable resistance elements Q201 and Q202 is formed of, for example, an enhancement type NMOS transistor in which drain current does not flow when the gate voltage is 0V.

Here, the bias current will be explained. In a diode type light-emitting element, the bias current indicates a current flowing between the anode and the cathode so that the voltage between the anode and the cathode becomes approximately the on-voltage (current rising voltage Vf) of the diode type light-emitting element. Further, when a semiconductor laser is used, the bias current indicates a current smaller than oscillation threshold current Ith. In each case, the bias current is smaller than current by which the light-emitting element generates a light signal (driving current). For example, in the case of the diode type light-emitting element, the driving current is about 5 mA, while the bias current is about 100 μA. The bias current is used to decrease the load of a circuit, to decrease the jitters of a transmission signal, and to support a high-speed signal. It is necessary to supply the bias current so that the first and the second light-emitting elements 3 and 4 emit light stably and at high speed.

FIG. 4 is a graph g1 showing the relationship between the bias current and the voltage of a semiconductor laser capable of being used as the first and the second light-emitting elements 3 and 4 and a graph g2 showing the relationship between the bias current and the light output of the semiconductor laser. As shown in FIG. 4, when the bias current exceeds Ith, each graph has a relatively linear characteristic. By modulating the semiconductor laser within a region in which this linearity can be secured (a region in which the voltage is equal to or greater than the current rising voltage Vf in the relationship between the current and the voltage), light can be stably emitted without complicating the circuit.

Further, in the semiconductor laser, it takes a time by when the density of carriers implanted in an active layer becomes the threshold density required to achieve laser oscillation. Therefore, there exists a delay (oscillation delay) between when the current starts to flow and when the laser oscillation actually starts, which leads to a characteristic that the pulse width of the light output wave pattern is shorter than that of the digital electric input signal. This is a problem particularly when performing high-speed signal transmission, in which the oscillation delay becomes large relatively with respect to the pulse width of the digital electric input signal. Further, there is a problem that the jitters of the transmission signal is increased, which is caused by a pattern effect that the oscillation delay changes depending on the wave pattern of the digital electric input signal. Since the bias current can effectively decrease the oscillation delay which is the cause of these problems by preliminarily implanting carriers, the jitters of the transmission signal can be decreased and the response of the transmission signal can be improved by using the bias current.

The bias current supplied by the first and the second variable resistance elements Q201 and Q202 is set so that the voltage between the anode and cathode of each of the first and the second light-emitting elements 3 and 4 becomes the on-voltage (current rising voltage Vf) of each of the first and the second light-emitting elements 3 and 4 (100 μA, for example). Accordingly, compared to the case where the bias current is not supplied, the impedance (differential resistance) of the first and the second light-emitting elements 3 and 4 can be decreased to one tenth, for example, by which the drive load of the MOS transistors Q1 to Q4 for controlling the light emission of the first and the second light-emitting elements 3 and 4 can be decreased. Further, by supplying the bias current to the first and the second light-emitting elements 3 and 4 in advance, the modulation process can be performed in a differential resistance region which is relatively linear and is above the region in which the diode current of the first and the second light-emitting elements 3 and 4 rises. Furthermore, the oscillation delay of the first and the second light-emitting elements 3 and 4 is decreased, by which light can be emitted stably and at high speed.

The first and the second light-emitting elements 3 and 4 convert the first and the second electric pulse signals into a first and a second light signals, respectively. The first and the second light-emitting elements 3 and 4 can be formed of discrete parts separate from each other, and can be formed of a light-emitting element array in which two or more light-emitting elements are integrated on one substrate.

The first and the second optical transmission paths 5 and 6 transmit the first and the second light signals, respectively. Each of the first and the second optical transmission paths 5 and 6 can be formed of an optical fiber or an optical waveguide.

The first and the second light-receiving elements 7 and 8 convert the first and the second light signals into a third and a fourth electric pulse signals, respectively. The first and the second light-receiving elements 7 and 8 can be formed of discrete parts separate from each other, and can be formed of a light-receiving element array in which two or more light-receiving elements are integrated on one substrate.

The receiving circuit 10 includes a resistance element 18 connected between the anode of the first light-receiving element 7 and a ground terminal, a resistance element 20 connected between the anode of the second light-receiving element 8 and the ground terminal, and an SR flip-flop 21. The resistance elements 18 and 20 are provided in order to convert the current flowing through the first and the second light-receiving elements 7 and 8 into voltage. The receiving circuit 10 (or part thereof) can be implemented by a receiver IC formed of one IC chip. In this case, the receiver IC may include other circuits (functions). For example, a serial-parallel output signal conversion circuit can be provided in a signal output part of the receiver IC to output a parallel signal.

Figure 5:
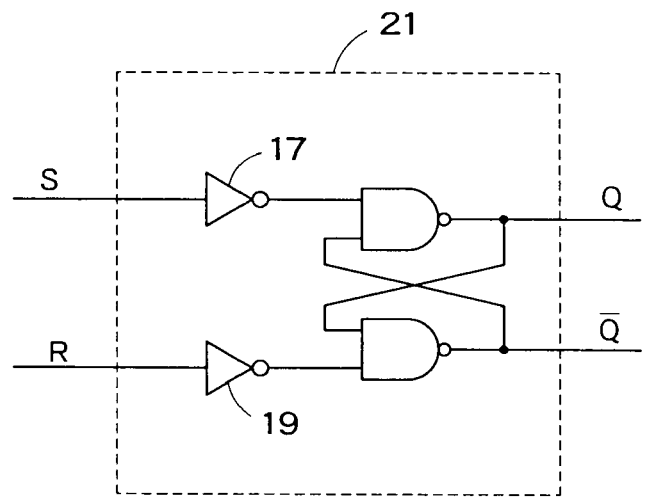
FIG. 5 is a circuit diagram showing an example of an internal configuration of an SR flip-flop.

As shown in FIG. 5, the SR flip-flop 21 has two inverter circuits 17 and 19 and two NAND circuits, for example. The inverter circuit 17 inverts the signal inputted from the input terminal S, while the inverter circuit 19 inverts the signal inputted from the input terminal R. In the SR flip-flop 21, the signal outputted from the output terminal Q changes from low to high when the signal inputted into the input terminal S changes from low to high (called set operation), and the signal outputted from the output terminal Q changes from high to low when the signal inputted into the input terminal R changes from low to high (called reset operation). Therefore, the output terminal Q of the SR flip-flop 21 becomes high when the anode voltage (third electric pulse signal) of the first light-receiving element 7 changes to high, and becomes low when the anode voltage (fourth electric pulse signal) of the second light-receiving element 8 changes to high. The output terminal Q of the SR flip-flop 21 is connected to the output terminal 9a, and the signal outputted from the output terminal 9a is a digital electric output signal.

The output of the receiving circuit 10 can be a single end output of the only output signal outputted from the output terminal Q of the SR flip-flop 21. However, when the SR flip-flop 21 has both of the output terminal Q and the output terminal /Q (inversion of Q), the inverted signal of the digital electric output signal can be outputted from the output terminal 9b connected to the output terminal /Q, and the digital electric output signal can be outputted from the output terminal 9a, respectively. In this case, the digital electric output signal can be obtained based on a differential output. Further, it is possible to amplify the output signal of the SR flip-flop 21 or shape the waveform thereof by arranging a differential buffer (not shown in the drawings) at a subsequent stage of the SR flip-flop 21 (a buffer is provided in the case of a single end output).

Hereinafter, an operation of the complementary optical wiring system of FIG. 1 will be explained using the timing diagram of FIG. 2. Note that the signal timing at each node does not necessarily correspond to that shown in FIG. 2. This is because, in the actual operation, signal generation/transmission performed in each circuit requires constant times to generate the first and the second electric pulse signals, to generate and transmit the first and the second light signals, to generate the third and the fourth electric pulse signals, and to generate the digital electric output signal. However, such a timing difference, which does not directly affect on the essential operation of the present embodiment, will be disregarded hereinafter if not otherwise specified.

As shown in FIG. 2, the output signal A(B) of the first differential output terminal having the same logic information as the digital electric input signal is low-level until time t1. Therefore, until time t1, the signal A' (first digital electric control signal D) is high-level, by which the first variable resistance element Q201 becomes low impedance and the bias current is supplied to the first light-emitting element 3.

When the signal A(B) changes from low to high at time t1, the output signal C of the first delay circuit 13 changes from high to low at time t2, which is after time t1. At time t2, both of the MOS transistors Q1 and Q2 are only turned on only from time t1 to t2, and the driving current (first electric pulse signal) in synchronization with the rising edge of the digital electric input signal flows through the MOS transistors Q1 and Q2. With this driving current, the first light-emitting element 3 generates the first light signal. Since the bias current is supplied to the first light-emitting element 3 until time t1, the first light-emitting element 3 starts light-emitting operation stably and quickly when the MOS transistors Q1 and Q2 are turned on at time t1.

On the other hand, at time t1, the signal A (second digital electric control signal H) changes to high. Therefore the second variable resistance element Q202 becomes low impedance and the bias current is supplied to the second light-emitting element 4.

After that, when the signal A changes from high to low at time t3, the output signal G of the second delay circuit 14 changes from high to low at time t4, which is after time t3. At this time, both of the MOS transistors Q3 and Q4 are only turned on only from time t3 to t4, and the driving current (second electric pulse signal) in synchronization with the falling edge of the digital electric input signal flows through the MOS transistors Q3 and Q4. With this driving current, the second light-emitting element 4 generates the second light signal. Since the bias current is supplied to the second light-emitting element 4 until time t3, the second light-emitting element 4 starts light-emitting operation stably and quickly when the MOS transistors Q3 and Q4 are turned on at time t3.

As stated above, the first variable resistance element Q201 becomes low impedance until time t1, at which the first electric pulse signal is generated, to supply the bias current to the first light-emitting element 3, and becomes high impedance from time t1 to t3 not to supply the bias current to the first light-emitting element 3.

Further, the second variable resistance element Q202 becomes high impedance until time t1 not to supply the bias current to the second light-emitting element 4, and becomes low impedance from time t1 to t3, at which the first electric pulse signal is generated, to supply the bias current to the second light-emitting element 4.

That is, in the present embodiment, the impedance of the first or the second variable resistance element Q201 or Q202 is lowered only for a period immediately before the first or the second light-emitting element 3 or 4 emits light and the first light signal in synchronization with the rising edge of the digital electric input signal or the second light signals in synchronization with the falling edge thereof is generated (the first or the second light-emitting element 3 or 4 is supplied with the first or the second electric pulse signal) so as to supply the bias current to the first or the second light-emitting element 3 or 4. In this way, the period to supply the bias current can be shortened and power consumption can be reduced.

With the control as stated above, the current (the sum of the driving current and the bias current) supplied to the first and the light-emitting elements 3 and 4 can be represented as E and I, respectively, as shown in FIG. 2.

The first light signal transmitted through the first optical transmission path 5 is converted into the third electric pulse signal by the first light-receiving element 7 and is converted into the voltage signal (signal S) by the resistance elements 18, while the second light signal transmitted through the second optical transmission path 6 is converted into the fourth electric pulse signal by the second light-receiving element 8 and is converted into the voltage signal (signal R) by the resistance elements 20. The SR flip-flop 21 raises the output Q (lowers the output /Q) when S changes from low to high, and lowers the output Q (raises the output /Q) when R changes from low to high.

As stated above, the complementary optical wiring system of FIG. 1 can output the digital electric output signal corresponding to the digital electric input signal inputted into the first and the second differential signal input terminals 1a and 1b from the output terminals 9a and 9b, respectively.

As stated above, according to the first embodiment, the bias current is supplied to the first and the second light-emitting elements 3 and 4 only for a period immediately before the first and the second light-emitting elements 3 and 4 are supplied with the first and the second electric pulse signals. Therefore, the period to supply the bias current can be shortened and power consumption can be reduced. Although the period to supply the bias current is shortened, the bias current is supplied at least for a period corresponding to the minimum pulse width of the digital electric input signal. Therefore, necessary and sufficient period to supply the bias current can be secured, differently from the above Patent Document 4. In the present embodiment, the bias current is alternately supplied to the first and second light-emitting elements in accordance with the logic of the digital electric input signal, by which electric energy consumed by supplying the bias current can be reduced to one half compared to the case where the bias current is supplied to two light-emitting elements all the time.

Further, in the present embodiment, only the rising edge and falling edge information of the digital electric input signal as the first and the second light signals are transmitted to the receiving circuit 10 through their own first and second optical transmission paths 5 and 6, thereby, reducing the frequency and time to emit the light of the first and the light-emitting elements 3 and also reducing optical power.

Further, in the present embodiment, the transmitting circuit 10 can be formed of only delay circuits and several transistors. Therefore, the circuit area can be reduced, and circuits to convert the digital electric input signal into the light signal, which support many channels, can be held in one IC chip. Furthermore, the generation of the bias current as stated above can be implemented only by using the MOS transistors Q201 and Q202.

In the present embodiment, the digital electric input signal is combined with the delay signal obtained by delaying the digital electric input signal only by a time shorter than the minimum pulse width of the digital electric input signal to generate the first and the second electric pulse signals having pulse widths corresponding to the delay time. The pulse combination becomes difficult if the digital electric input signal is delayed only by a time which is equal to or longer than the minimum pulse width of the digital electric input signal. This is because an overlapped period is not generated between the minimum pulse (1-bit single pulse) of the digital electric input signal and the same minimum pulse of its delay signal (for example, at a same time or after a minimum pulse falls in the digital electric input signal, the same minimum pulse rises in the delay signal). In addition, in this case, it is difficult for the receiving circuit 10 to generate the digital electric output signal, since there may be a case where the second light signal corresponding to the falling edge of the digital electric input signal is generated before the first light signal corresponding to the rising edge of the digital electric input signal falls, and as a result, an overlapped period therebetween is generated. These problems complicate the transmitting circuit 2 and the receiving circuit 10, which causes the increase in jitters and noise and the increase in the circuit area. In the present embodiment, the above problems are hardly caused since the delay signal obtained by delaying the digital electric input signal by a time shorter than the minimum pulse width of the digital electric input signal is used to generate the first and the second electric pulse signals.

When the above described delay time is substantially the same as the minimum pulse width of the digital electric input signal, the pulse widths of the first and the second electric pulse signals become substantially the same as the minimum pulse width of the digital electric input signal. In this case, when the minimum pulse of the digital electric input signal is transmitted, the total of the pulse widths of the first and the second electric pulse signals becomes equivalent to minimum pulse 2 bits of the digital electric input signal, resulting in a situation in which the signal transmission energy corresponding to 2 bits is consumed for signal transmission of 1 bit, which is against low power consumption.

However, since NRZ (Non Return to Zero) signals are generally used as digital signals used in a logic circuit such as an LSI, there is no rising edge or falling edge between bits of continuous bit data ("1111 . . . ", "0000 . . . "), and pulse signal transmission between the continuous bit data is not necessary. Therefore, in this case, when the average continuous bit length of the digital electric input signal is two bits or more, it is possible to reduce power consumption more than in general optical wiring that optically transmits the digital electric input signal itself.

Furthermore, since the pulse widths of the first and second electric pulse signals are substantially the same as the minimum pulse width of the digital electric input signal, it is possible to increase the bit rate of the digital electric input signal until a maximum transmission frequency band of the optical wiring path (path from the first and the second light-emitting elements 3 and 4 through the first and the second optical transmission paths 5 and 6 to the first and the second light-receiving elements 7 and 8) and secure a high transmission frequency band while reducing power consumption.

The transmitting circuit 2 of the present embodiment generates the first and the second electric pulse signals without performing differential processing and causes no such problems as a shortage of light-emitting current due to time constant restrictions or waveform distortion due to a pattern effect or further occurrence of excessive pulses due to inrush current during burst operation, and therefore the voltage amplitudes of the first and the second electric pulse signals are quite stable so that transmission errors can be prevented.

The present embodiment transmits rising edge information and falling edge information of the digital electric input signal through separate optical transmission paths. Because of this, it is possible to easily identify whether the transmitted optical pulse corresponds to the rising edge or the falling edge of the digital electric input signal. Therefore, even if the receiving side fails to receive one optical pulse or a plurality of optical pulses due to the influence of noise for example, it is possible to correctly generate a digital electric output signal if subsequent optical pulses are received. Moreover, even if the pulse width of the digital electric input signal is small (when the bit rate of the digital electric input signal is high), there is a low possibility that the optical pulse corresponding to the rising edge and the optical pulse corresponding to the falling edge may interfere with each other.

In the present embodiment, the electric path to apply the first electric pulse signal corresponding to the rising edge to the first light-emitting element 3 is provided separately from the electric path to apply the second electric pulse signal corresponding to the falling edge to the second light-emitting element 4. Therefore, the anodes of the first and the second light-emitting elements 3 and 4 are independent of each other as circuitry, and bias currents can be independently supplied to both light-emitting elements. Compared to a case where light-emitting elements are connected in series as in the case of the circuits shown in Patent Document 1, it is possible to lower a power supply voltage necessary to obtain a desirable bias current to be reduced to about half (e.g., 1.5 to 2.0 V), thereby obtaining an optical wiring system driven by only a power supply voltage supplied to a normal electronic device.

Figure 6:
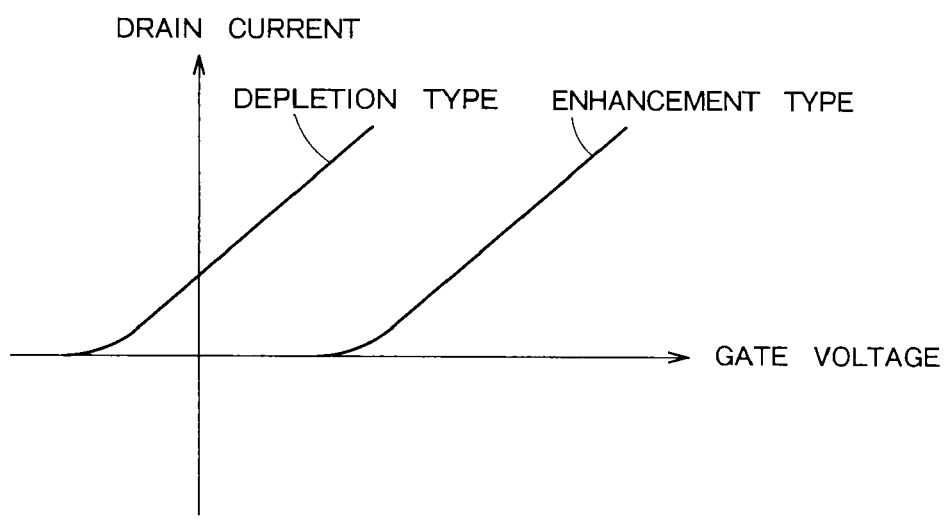
FIG. 6 is a graph showing characteristics between gate voltage and drain current of an enhancement type NMOS transistor and a depletion type NMOS transistor.

In the example shown in the present embodiment, the first and the second variable resistance elements Q201 and Q202 are enhancement type NMOS transistors. However, these elements can be replaced with depletion type NMOS transistors. FIG. 6 is a graph showing characteristics between gate voltage and drain current of the enhancement type NMOS transistor and the depletion type NMOS transistor. As stated above, in the enhancement type NMOS transistor, drain current does not flow when the gate voltage is 0 V. Accordingly, the first and the second variable resistance elements Q201 and Q202 function as on/off switches. On the other hand, because the depletion type NMOS transistor has a thin channel layer formed in advance through doping, drain current flows even when the gate voltage is 0 V. Accordingly, the first variable resistance element Q201 functions as a variable impedance element which becomes low impedance when the signals D is high and becomes high impedance when the signals D is low, while the second variable resistance element Q202 functions as a variable impedance element which becomes low impedance when the signals H is high and becomes high impedance when the signals H is low.

The internal structure of the complementary optical wiring system explained above can be variously changed. In the following embodiments, modification examples of FIG. 1 will be shown.

Second Embodiment

In an example shown in the first embodiment, each of the MOS transistors Q1 and Q2 is driven to have a different delay time, and similarly, each of the MOS transistors Q3 and Q4 is driven to have a different delay time. In a second embodiment, which will be explained hereinafter, each of the first and the second electric pulse signals is generated by one MOS transistor and one NOR circuit.

Figure 7:
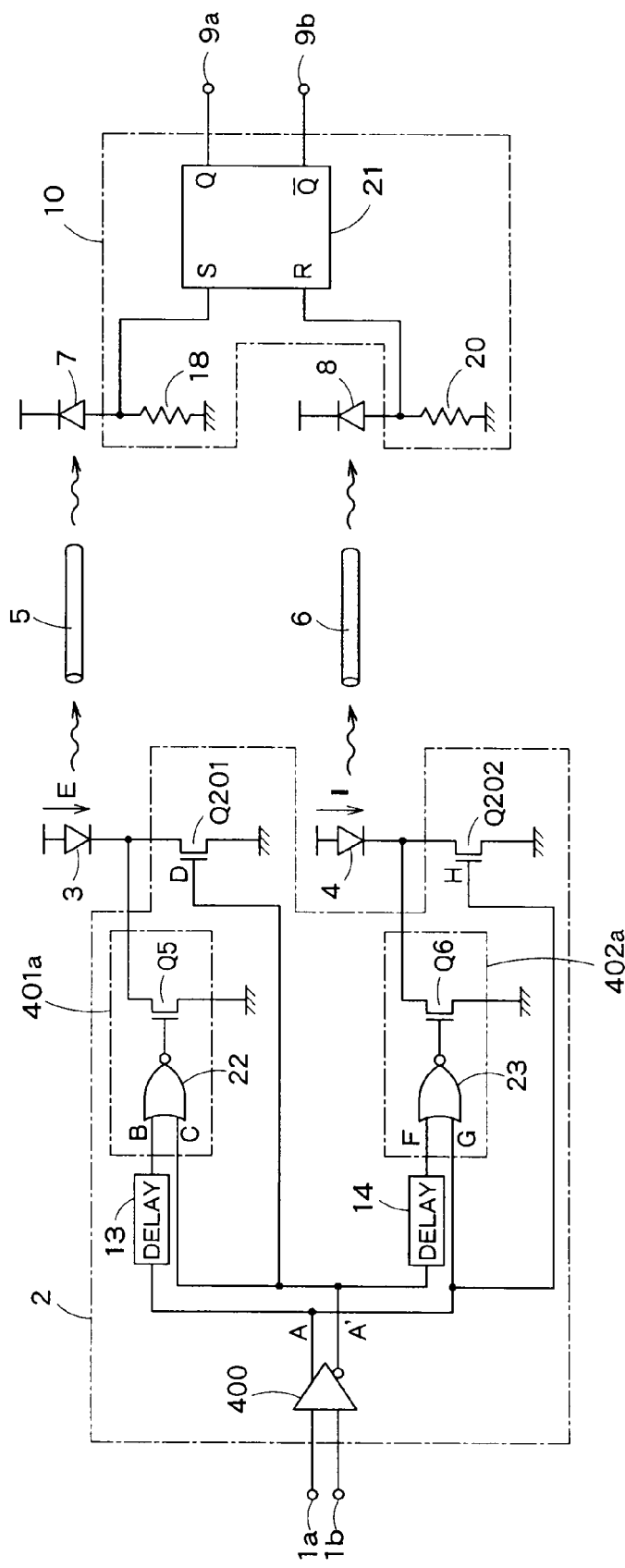
FIG. 7 is a circuit diagram showing a modification example of a schematic structure of the complementary optical wiring system of FIG. 1.
Figure 8:
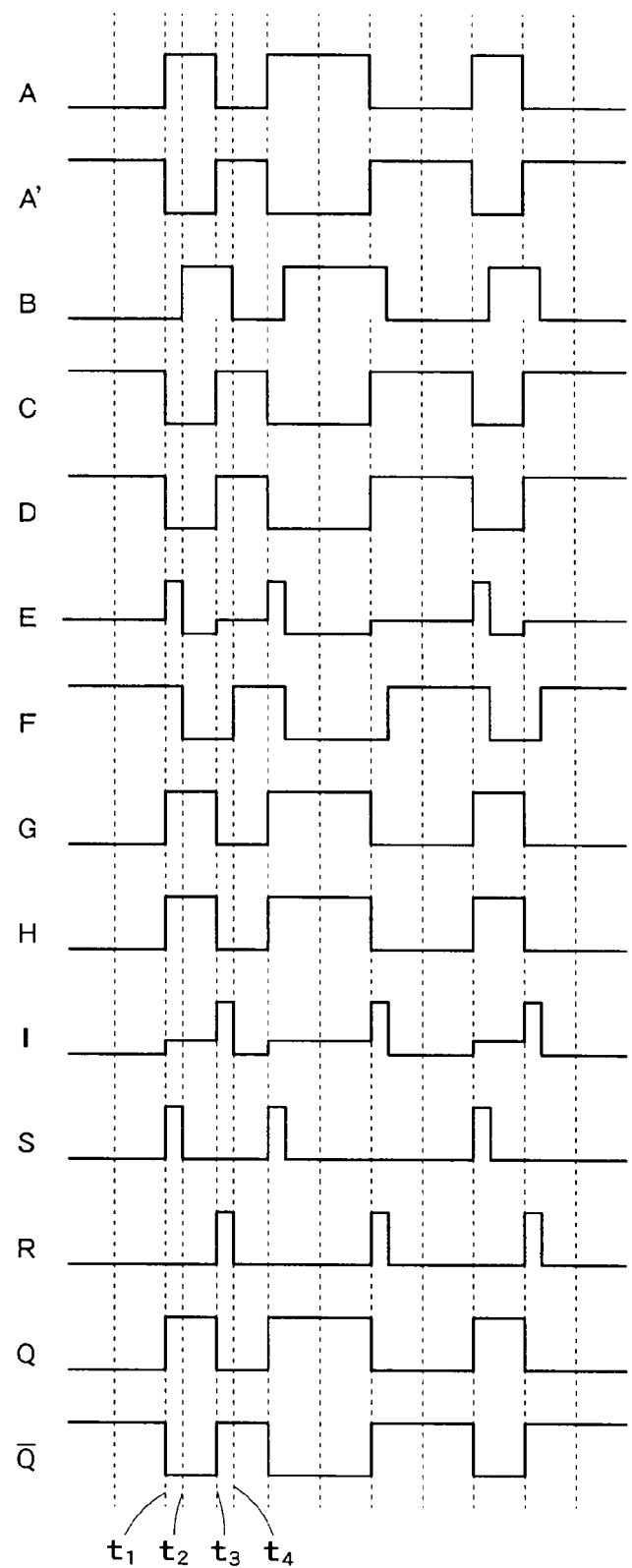
FIG. 8 is a timing diagram at each node of the system of FIG. 7.

FIG. 7 is a circuit diagram showing a modification example of the schematic structure of the complementary optical wiring system of FIG. 1. FIG. 8 is a timing diagram at each node in the system of FIG. 7. In FIG. 8, the vertical axes of the reference symbols E and I express the electric current flowing through the first and the second light-emitting elements 3 and 4 respectively, and each vertical axis of the other reference symbols expresses the voltage at each node. In FIG. 7, the same numerals are attached to the components common to those in FIG. 1, and the differences will be mainly explained hereinafter.

In FIG. 7, the internal structure of the transmitting circuit 2 is different from that of FIG. 1, and the other components are the same as those of FIG. 1. The transmitting circuit 2 of FIG. 7 includes the differential buffer 400, the first and the second delay circuits 13 and 14, a first transmitter 401*a* formed of a NOR circuit 22 (first logic circuit) and an NMOS transistor Q5 (first switching element), a second transmitter 402*a* formed of a NOR circuit 23 (second logic circuit) and an NMOS transistor Q6 (second switching element), the first variable resistance element (first variable impedance circuit) formed of the NMOS transistor Q201, and the second variable resistance element (second variable impedance circuit) formed of the NMOS transistor Q202.

In the first transmitter 401a, the gate of the NMOS transistor Q5 is connected to the output terminal of the NOR circuit 22, the drain thereof is connected to the cathode of the first light-emitting element 3, and the source thereof is grounded. In the second transmitter 402a, the gate of the NMOS transistor Q6 is connected to the output terminal of the NOR circuit 23, the drain thereof is connected to the cathode of the second light-emitting element 4, and the source thereof is grounded.

The first delay circuit 13 delays the output signal A (having the same logic information as that of the digital electric input signal) at the first differential output terminal of the differential buffer 400. The NOR circuit 22 outputs a signal which is a result of a NOR operation on the output signal B of the first delay circuit 13 and the output signal C (A') (having the same logic information as that of the inverted signal of the digital electric input signal) at the second differential output terminal of the differential buffer 400. The NOR circuit 22 outputs high when both of the output signal B of the first delay circuit 13 and the output signal C of the second differential output terminal are low.

The second delay circuit 14 delays the output signal A' (having the same logic information as that of the inverted signal of the digital electric input signal) at the second differential output terminal of the differential buffer 400. The NOR circuit 23 outputs a signal which is a result of a NOR operation on the output signal F of the second delay circuit 14 and the output signal G(A) (having the same logic information as that of the digital electric input signal) at the first differential output terminal. The NOR circuit 23 outputs high when both of the output signal F of the second delay circuit 14 and the output signal G of the first differential output terminal are low.

The present embodiment shows an example in which the first transmitter 401a generates the first electric pulse signal by combining the signal A' with the delay signal of the signal A, while the second transmitter 402a generates the second electric pulse signal by combining the signal A with the delay signal of the signal A'.

The output signal of the NOR circuit 22 is inputted into the gate of the MOS transistor Q5. Accordingly, as shown in FIG. 8, the MOS transistor Q5 temporarily becomes low impedance and the driving current (first electric pulse signal) flows therethrough in the period from time t1 to t2 etc. in which both of the output signal B of the first delay circuit 13 and the output signal C of the second differential output terminal are low, more specifically, when the digital electric input signal changes from low to high. With this driving current, the first light-emitting element 3 generates the first light signal.

On the other hand, the output signal of the NOR circuit 23 is inputted into the gate of the MOS transistor Q6. Accordingly, as shown in FIG. 8, the MOS transistor Q6 temporarily becomes low impedance and the driving current (second electric pulse signal) flows therethrough in the period from time t3 to t4 etc. in which both of the output signal F of the second delay circuit 14 and the output signal G of the first differential output terminal are low, more specifically, when the digital electric input signal changes from high to low. With this driving current, the second light-emitting element 4 generates the second light signal.

As stated above, the timing at which the first and the second light-emitting elements 3 and 4 generate the first and the second light signals are similar to those of FIG. 1.

On the other hand, similarly to FIG. 1, in FIG. 7, the output signals A'(D) and A(H) of the second and the first differential output terminals are inputted into the gates of the MOS transistors Q201 and Q202. Accordingly, as in the first embodiment, the impedance of the transistor Q201 or Q202 is lowered only for a period immediately before the first or the second light-emitting element 3 or 4 is supplied with the first or the second electric pulse signal so as to supply the bias current to the first or the second light-emitting element 3 or 4.

As stated above, a similar effect to the first embodiment can be obtained in the second embodiment.

Third Embodiment

In the first and second embodiments, the bias current to be supplied to the first and the second light-emitting elements 3 and 4 is generated by directly using the output signal from the differential buffer 400. In a third embodiment, which will be explained hereinafter, the bias current is generated by using the output signals of the first and the second delay circuits 13 and 14.

Figure 9:
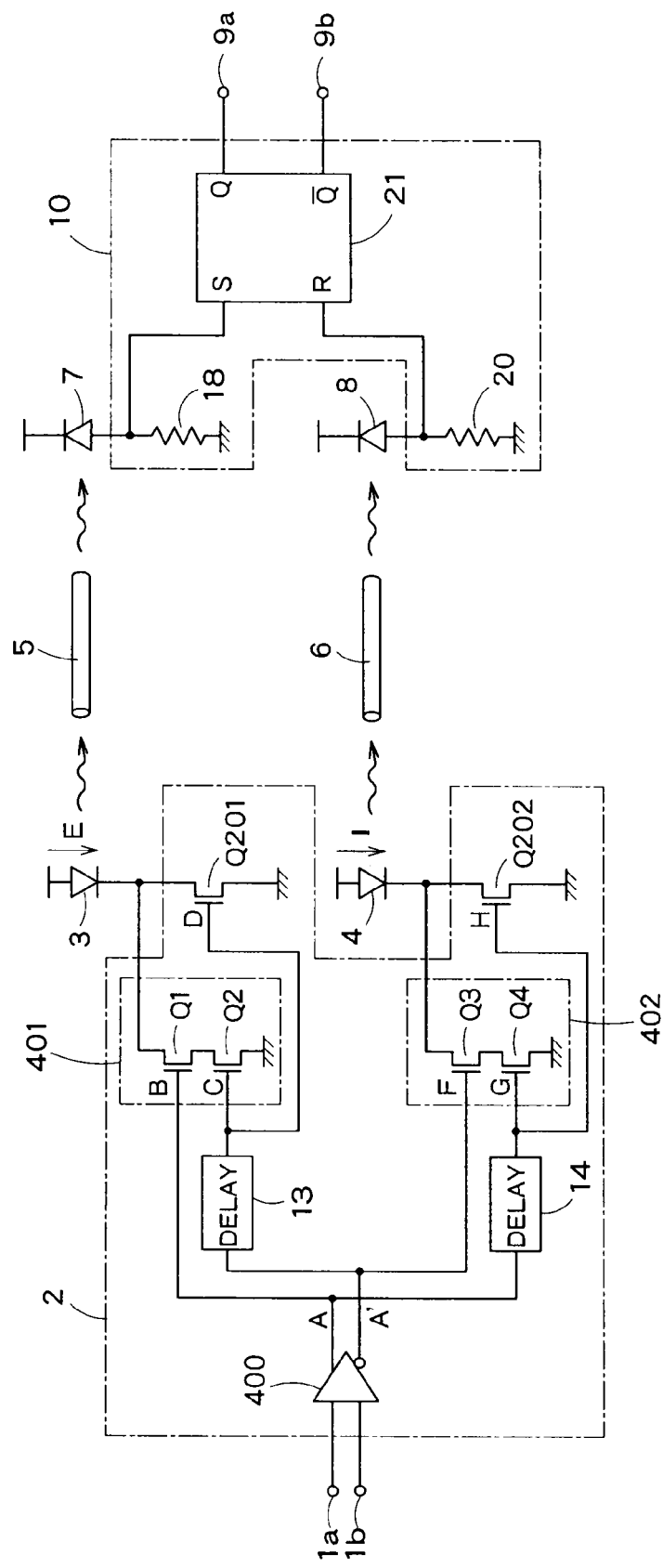
FIG. 9 is a circuit diagram showing another modification example of a schematic structure of the complementary optical wiring system of FIG. 1.
Figure 10:
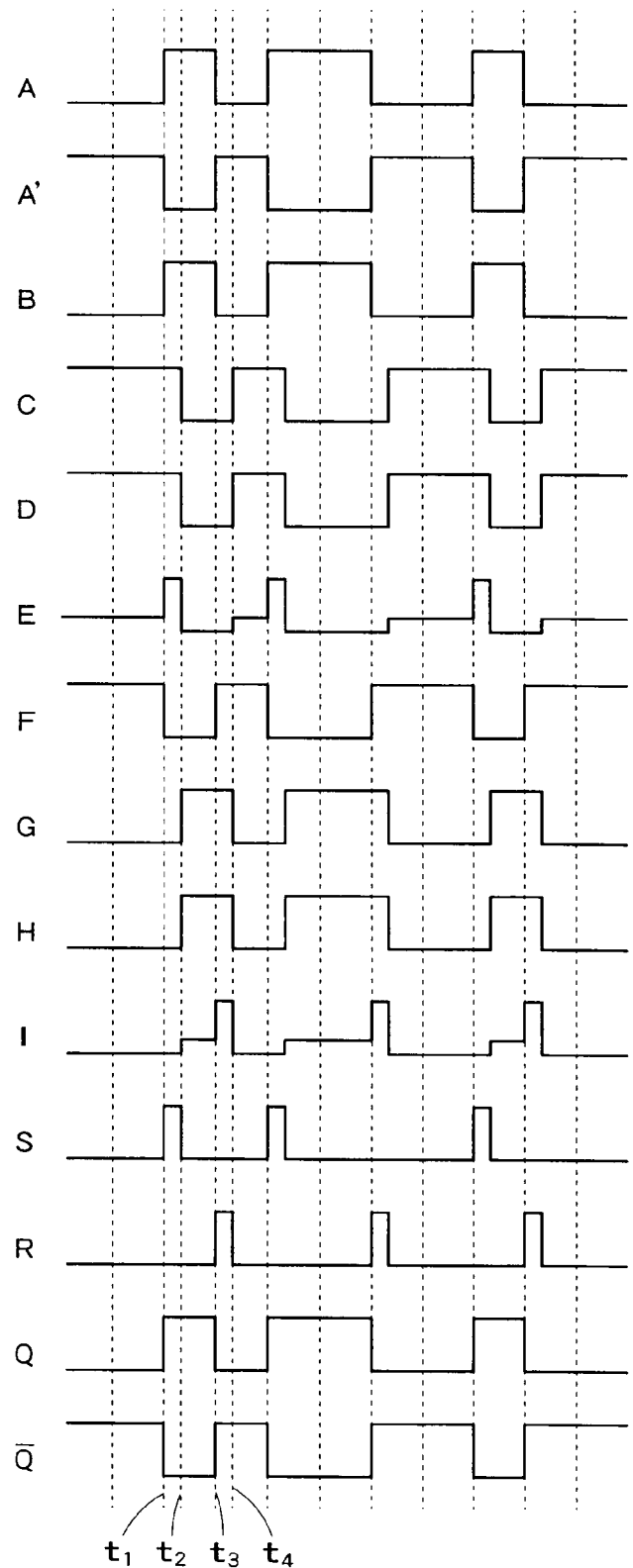
FIG. 10 is a timing diagram at each node of the system of FIG. 9.

FIG. 9 is a circuit diagram showing another modification example of the schematic structure of the complementary optical wiring system of FIG. 1. FIG. 10 is a timing diagram at each node in the system of FIG. 9. In FIG. 10, the vertical axes of the reference symbols E and I express the electric current flowing through the first and the second light-emitting element 3 and 4 respectively, and each vertical axis of the other reference symbols expresses the voltage at each node. In FIG. 9, the same numerals are attached to the components common to those in FIG. 1, and the differences will be mainly explained hereinafter.

In FIG. 9, the internal structure of the transmitting circuit 2 is different from that of FIG. 1. In FIG. 1, the gate of the first variable resistance element Q201 is connected to the second differential output terminal A', while the gate of the second variable resistance element Q202 is connected to the first differential output terminal A. On the other hand, in FIG. 9, the gate of the first variable resistance element Q201 is applied with the first digital electric control signal D (the output signal C of the first delay circuit 13), while the gate of the second variable resistance element Q202 is applied with the second digital electric control signal H (the output signal G of the second delay circuit 14).

Therefore, in FIG. 10, compared to FIG. 1, the timing to supply the bias current to the first and the second light-emitting elements 3 and 4 delays by a delay time of the first and the second delay circuit 13 and 14. That is, in the present embodiment, the first variable resistance element Q201 becomes low impedance until time t2 to supply the bias current to the first light-emitting element 3, and becomes high impedance from time t2 to t4 not to supply the bias current to the first light-emitting element 3. Further, the second variable resistance element Q202 becomes high impedance until time t2 not to supply the bias current to the second light-emitting element 4, and becomes low impedance from time t2 to t4, at which the first electric pulse signal is generated, to supply the bias current to the second light-emitting element 4.

On the other hand, the first and the second transmitters 401 and 402 are controlled similarly to FIG. 1. Accordingly, the first light-emitting element 3 generates the first light signal in the period from time t1 to t2, for example. Further, the second light-emitting element 4 generates the second light signal in the period from time t3 to t4, for example.

That is, the first and the second variable resistance elements Q201 and Q202 supply the bias current only for a limited period which starts immediately before the first and the second light-emitting elements 3 and 4 start to generate the first and the second light signals and last until the first and the second light-emitting elements 3 and 4 finish emitting light. With such a structure, in the third embodiment, compared to the first and second embodiments, the length of the periods in which the bias current is supplied to the first and the second light-emitting elements 3 and 4 is the same, but the timing supplying the bias current is delayed a little.

As stated above, in the third embodiment, the output signals C, G (D, G) of the first and the second delay circuits 13 and 14 are used as the first and the second digital electric control signals respectively, and bias current is supplied only for a period from immediately before the first and the second light-emitting elements 3 and 4 start to supply with the first and the second electric pulse signals until finish to supply with them, thereby reducing power consumption and securing necessary and sufficient period to supply the bias current.

As a modification example of FIG. 9, as in FIG. 7, the MOS transistor Q5 and the NOR circuit 22 can be provided instead of the MOS transistors Q1 and Q2, while the MOS transistor Q6 and the NOR circuit 23 can be provided instead of the MOS transistors Q3 and Q4.

Fourth Embodiment

In the first to third embodiments, the anode sides of the first and the second light-emitting elements 3 and 4 are connected to a common power source terminal, which is a so-called anode common type connection. On the other hand, in a fourth embodiment, which will be explained hereinafter, the cathode sides of the first and the second light-emitting elements 3 and 4 are grounded, which is a so-called cathode common type connection.

FIG. 11 is a circuit diagram showing another modification example of the schematic structure of the complementary optical wiring system of FIG. 1. FIG. 12 is a timing diagram at each node in the system of FIG. 11. In FIG. 12, the vertical axes of the reference symbols E and I express the electric current flowing through the first and the second light-emitting elements 3 and 4 respectively, and each vertical axis of the other reference symbols expresses the voltage at each node. In FIG. 11, the same numerals are attached to the components common to those in FIG. 1, and the differences will be mainly explained hereinafter.

In the present embodiment, the first and the second light-emitting elements 3 and 4 are connected by cathode-common, and PMOS transistors Q301 to Q306 are used instead of the NMOS transistors. Further, a differential inverter 403 is used instead of the differential buffer. The differential inverter 403 outputs the same logic information as that of the inverted signal of the digital electric input signal from the first differential output terminal A, and outputs the same logic information as that of the digital electric input signal from the second differential output terminal A'.

The MOS transistors Q301 and Q302 (first and second switching elements) are cascade-connected between the anode of the first light-emitting element 3 and a power source terminal (reference voltage terminal). The gate of the MOS transistor Q301 is connected to the first differential output terminal A, while the gate of the MOS transistor Q302 is connected to the output terminal of the first delay circuit 13. The MOS transistors Q301 and Q302 form a first transmitter 401b for generating the first electric pulse signal.

The MOS transistors Q303 and Q304 (third and fourth switching elements) are cascade-connected between the anode of the second light-emitting element 4 and the power source terminal. The gate of the MOS transistor Q303 is connected to the second differential output terminal A', while the gate of the MOS transistor Q304 is connected to the output terminal of the second delay circuit 14. The MOS transistors Q303 and Q304 form a second transmitter 402b for generating the second electric pulse signal.

The present embodiment shows an example in which the first transmitter 401b generates the first electric pulse signal by combining the signal A with the delay signal of the signal A', while the second transmitter 402b generates the second electric pulse signal by combining the signal A' with the delay signal of the signal A.

The first variable resistance element formed of the PMOS transistor Q305 is connected between the anode of the first light-emitting element 3 and the power source terminal, and its gate is connected to the second differential output terminal A'. The second variable resistance element formed of the PMOS transistor Q306 is connected between the anode of the second light-emitting element 4 and the power source terminal, and its gate is connected to the first differential output terminal A. The first and the second variable resistance elements Q305 and Q306 switch whether or not to supply bias current to the first and the second light-emitting elements 3 and 4, respectively.

As explained in the first embodiment, if the first and the second variable resistance elements Q305 and Q306 are enhancement type PMOS transistors, these elements function as on/off switches. On the other hand, if the first and the second variable resistance elements Q305 and Q306 are depletion type PMOS transistors, these elements function as variable impedance elements.

In FIG. 11, the PMOS transistors Q301 to Q306 are used instead of the NMOS transistors Q1 to Q4, Q201, and Q202 in FIG. 1. Further, the first and the second light-emitting elements 3 and 4 are connected by cathode-common, while the first and the second light-emitting elements 3 and 4 of FIG. 1 are connected by anode-common. Therefore, in FIG. 11, compared to FIG. 1, the polarities of high and low of the signal inputted into the gate of the MOS transistor are reversed. However, the first and the second light-emitting elements 3 and 4 operate at a similar timing to that of FIG. 1, and a similar effect to FIG. 1 can be obtained.

As stated above, in the fourth embodiment, the connection configuration of the first and the second light-emitting elements 3 and 4 is different from that of the first embodiment, but similarly to the first embodiment, the bias current is supplied to the first and the second light-emitting elements 3 and 4 only for a period immediately before the first and the second light-emitting elements 3 and 4 are supplied with the first and the second electric pulse signals. Therefore, power consumption can be reduced and necessary and sufficient period to supply the bias current can be secured.

Also in the second and third embodiments, the first and the second light-emitting elements 3 and 4 are connected by cathode-common similarly to the fourth embodiment.

In each embodiment explained above, the first and the second light-receiving elements 7 and 8 are connected by cathode-common, but the anode common connection is also available. As in the case of the light-emitting elements, the configuration of peripheral circuits should be properly changed in accordance with the common connection method.

Further, in the examples shown in the embodiments explained above, the digital electric input signal inputted into the transmitting circuit 2 is a differential signal, but the signal can be a single end signal. FIG. 13 is a circuit diagram showing a schematic structure of a complementary optical wiring system in which the digital electric input signal of FIG. 1 is replaced with a single end signal. In this case, as shown in FIG. 13, a differential conversion buffer 12 for converting a single end signal into differential signals can be provided instead of the differential buffer 400. It is also possible to divide the single end signal into two single end signals to use one of them (referred to as a signal A1) and the inverted signal (referred to as a signal A2) obtained by inverting the other of them by an inverter circuit, for example. In this case, since the signal A2 is a signal further delaying the signal A1 in accordance with the circuit delay of the inverter circuit, the first or second electric pulse may be possibly generated without using the delay circuit 13 or 14. However, in such a case, since the inverter circuit can be considered to have the delay circuit 13 or 14, such a case does not depart from the scope of the present invention.

Further, in the examples shown in the embodiments explained above, the receiving circuit 10 is a so-called high impedance circuit in which a resistance element converts light receiving current into voltage. However, a transimpedance circuit formed of an amplifier and a negative feedback resistance element can be employed. In this case, there is a characteristic that a broader band operation can be performed and that noise is lower compared to the high impedance system.

Figure 14:
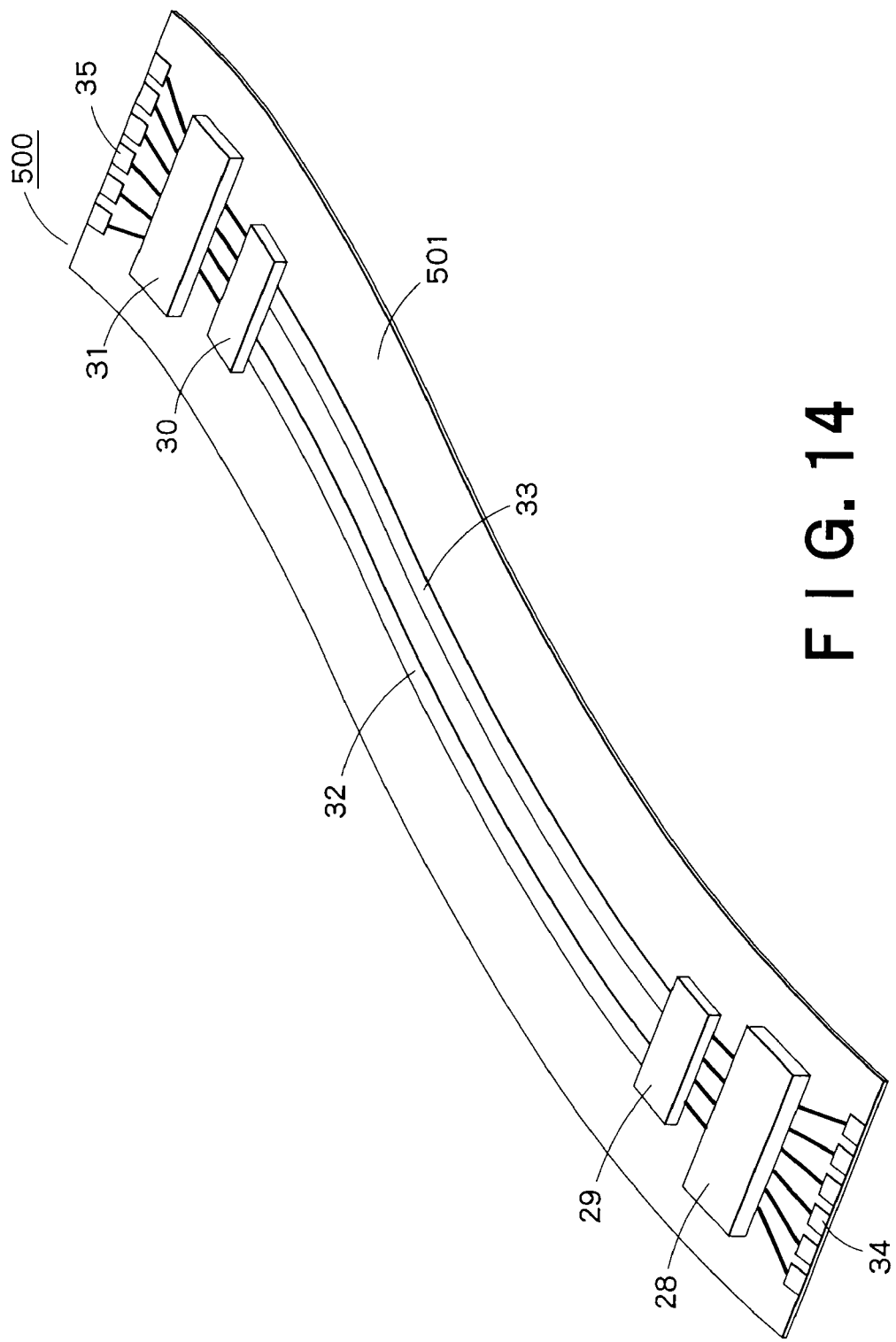
FIG. 14 is a perspective view showing an example of a complementary optical interconnection module 500 mounted with the system according to the above described embodiments.

FIG. 14 is a perspective view showing an example of a complementary optical interconnection module 500 mounted with the system according to the above described embodiments. The module 500 in FIG. 14 is provided with a transmitting side driver IC 28 incorporating the transmitting circuit 2 mounted on a flexible printed substrate (FPC) 501, a light-emitting element array 29 incorporating the first and the second light-emitting elements 3 and 4, a light-receiving element array 30 incorporating the first and the second light-receiving elements 7 and 8, and a receiving side receiver IC 31 incorporating the receiving circuit 10.

The first and second optical transmission paths 5 and 6 between the light-emitting element array 29 and the light-receiving element array 30 are formed of first and second optical waveguides 32 and 33, respectively. The total length of the first and second optical waveguides 32 and 33 is, for example, 10 to 20 cm. At both ends of the FPC 501, there are a plurality of contact terminals 34 connected to the transmitting side driver IC 28 and a plurality of contact terminals 35 connected to the receiving side receiver IC 31. These contact terminals 34 and 35 are connected to connectors (not shown) or connected to another circuit substrate by means of wire bonding or solder.

The shape of the FPC 501 can be modified arbitrarily, but it is possible to fabricate the FPC 501 so that even if the FPC is bent or twisted by a large amount, the first and second optical signals propagating through the first and second optical waveguides 32 and 33 are not shut off, weakened in optical intensity or do not include noise. Therefore, if the system shown in FIG. 14 is employed, it is possible to construct a small and thin system, and to reduce the manufacturing cost. Therefore, the present embodiment is widely applicable to high-speed signal wiring of the movable part in a small electronic device such as a mobile phone.

The present invention is not limited to the above described embodiments. The respective blocks, circuits, circuit elements in the circuits and the blocks, and other components explained in the above described respective embodiments are merely examples and can be replaced by alternate products having similar functions as appropriate. For example, an example where MOS transistors are used has been explained above, but field effect transistors other than MOS, bipolar transistors and Bi-CMOS transistors may also be used. Furthermore, various light-emitting elements such as light-emitting diodes and semiconductor lasers can be used as the first and second light-emitting elements 3 and 4. Furthermore, various light-receiving elements such as PIN photodiodes, MSM photodiodes, avalanche photodiodes, and photoconductors are available as the first and second light-receiving elements 7 and 8. Furthermore, optical fibers or optical waveguides may be used as the first and second optical transmission paths 5 and 6. In addition, the light-emitting element can be directly driven by a logic circuit, or can be driven utilizing the amplification effect of MOS transistors, bipolar transistors, etc.

Moreover, various types of processing and modifications can be applied without departing from the essence and technical scope of the present invention. Furthermore, the above described various embodiments can be combined appropriately as required.

The invention claimed is:

1. A transmitting circuit comprising:
    a first transmitter configured to generate a first electric pulse signal in synchronization with a rising edge of a digital electric input signal by combining at least one of the digital electric input signal and an inverted signal of the digital electric input signal with at least one of a first delay signal obtained by delaying the digital electric input signal by a time shorter than a minimum pulse width of the digital electric input signal and a second delay signal obtained by delaying the inverted signal of the digital electric input signal by a time shorter than the minimum pulse width of the digital electric input signal;
    a second transmitter configured to generate a second electric pulse signal in synchronization with a falling edge of the digital electric input signal by combining at least one of the digital electric input signal and the inverted signal of the digital electric input signal with at least one of the first delay signal and the second delay signal;
    a first variable impedance circuit configured to supply a bias current to a first light-emitting element only for a predetermined period before the first light-emitting element for converting the first electric pulse signal into a first light signal is supplied with the first electric pulse signal; and
    a second variable impedance circuit configured to supply a bias current to a second light-emitting element only for a predetermined period before the second light-emitting element for converting the second electric pulse signal into a second light signal is supplied with the second electric pulse signal.

2. The circuit of claim 1, wherein each of the first and the variable impedance circuits supplies the bias current to the first or the second light-emitting element based on the digital electric input signal, the inverted signal of the digital electric input signal, the first delay signal, or the second delay signal.

3. The circuit of claim 1, further comprising:
    a first delay circuit configured to generate the first delay signal by delaying the digital electric input signal by a time shorter than the minimum pulse width of the digital electric input signal; and
    a second delay circuit configured to generate the second delay signal by delaying the inverted signal of the digital electric input signal by a time shorter than the minimum pulse width of the digital electric input signal,
    wherein the first variable impedance circuit switches whether or not to supply the bias current to the first light-emitting element in synchronization with the input signal or the output signal of the first delay circuit, or in synchronization with the input signal or the output signal of the second delay circuit, and
    the second variable impedance circuit switches whether or not to supply the bias current to the second light-emitting element in synchronization with the input signal or the output signal of the first delay circuit, or in synchronization with the input signal or the output signal of the second delay circuit.

4. The circuit of claim 1, wherein the first variable impedance circuit supplies the bias current to the first light-emitting element only for a period from before the first light-emitting element starts to be supplied with the first electric pulse signal until the first light-emitting element starts to be supplied with the first electric pulse signal, and the second variable impedance circuit supplies the bias current to the second light-emitting element only for a period from before the second light-emitting element starts to be supplied with the second electric pulse signal until the second light-emitting element starts to be supplied with the second electric pulse signal.

5. The circuit of claim 4, wherein the first transmitter generates the first electric pulse signal when both of the digital electric input signal and the second delay signal have a predetermined logic, the first variable impedance circuit supplies the bias current to the first light-emitting element only for a period when the inverted signal of the digital electric input signal has the predetermined logic, the second transmitter generates the second electric pulse signal when both of the inverted signal of the digital electric input signal and the first delay signal have the predetermined logic, and the second variable impedance circuit supplies the bias current to the second light-emitting element only for a period when the digital electric input signal has the predetermined logic.

6. The circuit of claim 5, wherein the first transmitter comprises a first switching element and a second switching element connected between the first light-emitting element and a reference voltage terminal in series, the second transmitter comprises a third switching element and a fourth switching element connected between the second light-emitting element and the reference voltage terminal in series, the first switching element is turned on and off in synchronization with the digital electric input signal, the second switching element is turned on and off in synchronization with the second delay signal, the third switching element is turned on and off in synchronization with the inverted signal of the digital electric input signal, and the fourth switching element is turned on and off in synchronization with the first delay signal.

7. The circuit of claim 4, wherein the first transmitter generates the first electric pulse signal when both of the inverted signal of the digital electric input signal and the first delay signal have a first logic, the first variable impedance circuit supplies the bias current to the first light-emitting element only for a period when the inverted signal of the digital electric input signal has a second logic, which is different from the first logic, the second transmitter generates the second electric pulse signal when both of the digital electric input signal and the second delay signal have the first logic, and the second variable impedance circuit supplies the bias current to the second light-emitting element only for a period when the inverted signal of the digital electric input signal has the second logic.

8. The circuit of claim 7, wherein the first transmitter comprises:

a first logic circuit configured to perform a logical operation on the inverted signal of the digital electric input signal and the first delay signal; and a first switching element which is connected between the first light-emitting element and a reference voltage terminal and is configured to be turned on and off in synchronization with an output from the first logic circuit, and the second transmitter comprises:

a second logic circuit configured to perform a logical operation on the digital electric input signal and the second delay signal; and a second switching element which is connected between the second light-emitting element and the reference voltage terminal and is configured to be turned on and off in synchronization with an output from the second logic circuit.

9. The circuit of claim 4, wherein the first transmitter generates the first electric pulse signal when both of the inverted signal of the digital electric input signal and the first delay signal have a predetermined logic, the first variable impedance circuit supplies bias current to the first light-emitting element only for a period when the digital electric input signal has the predetermined logic, the second transmitter generates the second electric pulse signal when both of the digital electric input signal and the second delay signal have the predetermined logic, and the second variable impedance circuit supplies bias current to the second light-emitting element only for a period when the inverted signal of the digital electric input signal has the predetermined logic.

10. The circuit of claim 9, wherein the first transmitter comprises a first switching element and a second switching element connected between the first light-emitting element and a reference voltage terminal in series, the second transmitter comprises a third switching element and a fourth switching element connected between the second light-emitting element and the reference voltage terminal in series, the first switching element is turned on and off in synchronization with the inverted signal of the digital electric input signal, the second switching element is turned on and off in synchronization with the first delay signal, the third switching element is turned on and off in synchronization with the digital electric input signal, and the fourth switching element is turned on and off in synchronization with the second delay signal.

11. The circuit of claim 1, wherein the first variable impedance circuit supplies the bias current to the first light-emitting element only for a period from before the first light-emitting element starts to be supplied with the first electric pulse signal until the first light-emitting element finishes being supplied with the first electric pulse signal, and the second variable impedance circuit supplies the bias current to the second light-emitting element only for a period from before the second light-emitting element starts to be supplied with the second electric pulse signal until the second light-emitting element finishes being supplied with the second electric pulse signal.

12. The circuit of claim 11, wherein the first transmitter generates the first electric pulse signal when both of the digital electric input signal and the second delay signal have a predetermined logic, the first variable impedance circuit supplies the bias current to the first light-emitting element only for a period when the second delay signal has the predetermined logic, the second transmitter generates the second electric pulse signal when both of the inverted signal of the digital electric input signal and the first delay signal have the predetermined logic, and the second variable impedance circuit supplies the bias current to the second light-emitting element only for a period when the first delay signal has the predetermined logic.

13. The circuit of claim 12, wherein the first transmitter comprises a first switching elements and a second switching element between the first light-emitting element and a reference voltage terminal in series, the second transmitter comprises a third switching element and a fourth switching element between the second light-emitting element and the reference voltage terminal in series, the first switching element is turned on and off in synchronization with the digital electric input signal, the fourth switching element is turned on and off in synchronization with the second delay signal, the third switching element is turned on and off in synchronization with the inverted signal of the digital electric input signal, and the fourth switching element is turned on and off in synchronization with the first delay signal.

14. A complementary optical wiring system comprising:
a first light-emitting element configured to convert a first electric pulse signal in synchronization with a rising edge of a digital electric input signal into a first light signal;
a second light-emitting element configured to convert a second electric pulse signal in synchronization with a falling edge of the digital electric input signal into a second light signal;
a transmitting circuit comprising:
(a) a first transmitter configured to generate the first electric pulse signal by combining at least one of the digital electric input signal and an inverted signal of the digital electric input signal with at least one of a first delay signal obtained by delaying the digital electric input signal by a time shorter than a minimum pulse width of the digital electric input signal and a second delay signal obtained by delaying the inverted signal of the digital electric input signal by a time shorter than the minimum pulse width of the digital electric input signal;
(b) a second transmitter configured to generate the second electric pulse signal by combining at least one of the digital electric input signal and the inverted signal of the digital electric input signal with at least one of the first delay signal and the second delay signal;
(c) a first variable impedance circuit configured to supply a bias current to the first light-emitting element only for a predetermined period before the first light-emitting element starts to be supplied with the first electric pulse signal; and
(d) a second variable impedance circuit configured to supply a bias current to the second light-emitting element only for a predetermined period before the second light-emitting element starts to be supplied with the second electric pulse signal;

a first optical transmission path configured to transmit the first light signal;
a second optical transmission path configured to transmit the second light signal;
a first light-receiving element configured to convert the first light signal transmitted through the first optical transmission path to the third electric pulse signal;
a second light-receiving element configured to convert the second light signal transmitted through the second optical transmission path to the fourth electric pulse signal; and
a receiving circuit configured to generate a digital electric output signal corresponding to the digital electric input signal in synchronization with the third and the fourth electric pulse signal.

15. The system of claim 14, wherein each of the first and the variable impedance circuits supplies the bias current to the first or the second light-emitting element based on the digital electric input signal, the inverted signal of the digital electric input signal, the first delay signal, or the second delay signal.

16. The system of claim 15, wherein the transmitting circuit further comprises
a first delay circuit configured to generate the first delay signal by delaying the digital electric input signal by a time shorter than the minimum pulse width of the digital electric input signal; and
a second delay circuit configured to generate the second delay signal by delaying the inverted signal of the digital electric input signal by a time shorter than the minimum pulse width of the digital electric input signal,
the first variable impedance circuit switches whether or not to supply the bias current to the first light-emitting element in synchronization with the input signal or the output signal of the first delay circuit, or in synchronization with the input signal or the output signal of the second delay circuit, and
the second variable impedance circuit switches whether or not to supply the bias current to the second light-emitting element in synchronization with the input signal or the output signal of the first delay circuit, or in synchronization with the input signal or the output signal of the second delay circuit.

17. The system of claim 15, wherein the first variable impedance circuit supplies the bias current to the first light-emitting element only for a period from before the first light-emitting element starts to be supplied with the first electric pulse signal until the first light-emitting element starts to be supplied with the first electric pulse signal, and
the second variable impedance circuit supplies the bias current to the second light-emitting element only for a period from before the second light-emitting element starts to be supplied with the second electric pulse signal until the second light-emitting element starts to be supplied with the second electric pulse signal.

18. The system of claim 14, wherein the first transmitter generates the first electric pulse signal when both of the digital electric input signal and the second delay signal have a predetermined logic,
the first variable impedance circuit supplies the bias current to the first light-emitting element only for a period when the inverted signal of the digital electric input signal has the predetermined logic,
the second transmitter generates the second electric pulse signal when both of the inverted signal of the digital electric input signal and the first delay signal have the predetermined logic, and the second variable impedance circuit supplies the bias current to the second light-emitting element only for a period when the digital electric input signal has the predetermined logic.

19. The system of claim 14, wherein the first transmitter generates the first electric pulse signal when both of the inverted signal of the digital electric input signal and the first delay signal have a first logic, the first variable impedance circuit supplies the bias current to the first light-emitting element only for a period when the inverted signal of the digital electric input signal has a second logic, which is different from the first logic, the second transmitter generates the second electric pulse signal when both of the digital electric input signal and the second delay signal have the first logic, and the second variable impedance circuit supplies the bias current to the second light-emitting element only for a period when the inverted signal of the digital electric input signal has the second logic.

20. The system of claim 14, wherein the first variable impedance circuit supplies the bias current to the first light-emitting element only for a period from before the first light-emitting element starts to be supplied with the first electric pulse signal until the first light-emitting element finishes being supplied with the first electric pulse signal, and the second variable impedance circuit supplies the bias current to the second light-emitting element only for a period from before the second light-emitting element starts to be supplied with the second electric pulse signal until the second light-emitting element finishes being supplied with the second electric pulse signal.

* * * * *